Patented Sept. 7, 1948

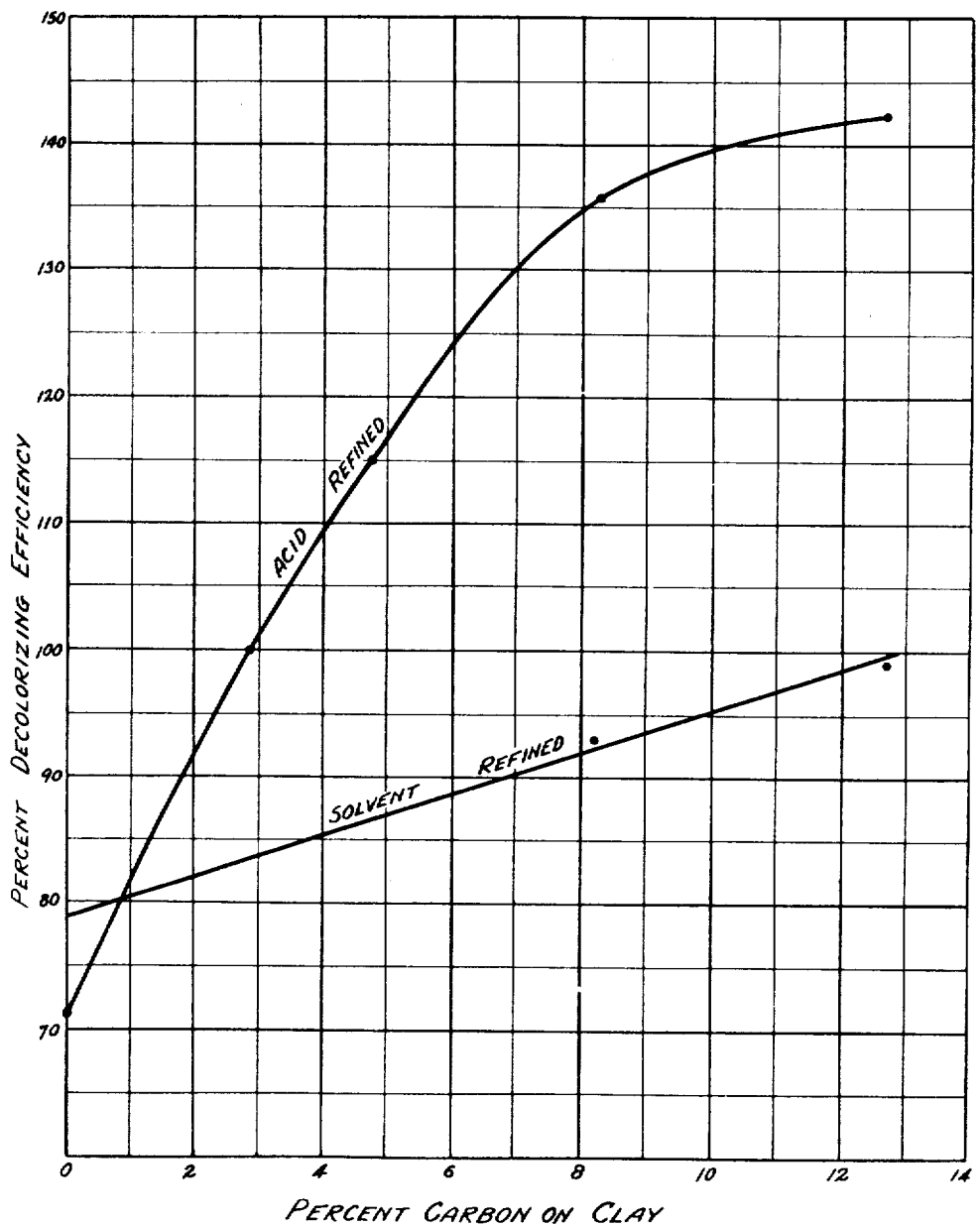

2,449,016

UNITED STATES PATENT OFFICE 2,449,016

ACTIVATION OF PETROLEUM ADSORBENTS

Thomas P. Simpson, John W. Payne, and Peter D. Valas, Woodbury, N. J., assignors to Socony-Vacuum Oil Company, Incorporated, a corporation of New York Application December 11, 1943, Serial No. 513,936

1 Claim. (Cl. 196—147)

This invention relates to a method for improving the activity and prolonging the useful life of solid adsorbent materials used in the refining of petroleum products. The invention particularly relates to the regeneration of clays used in the refining of petroleum products.

Enormous quantities of clays are used throughout the petroleum industry as filtering and adsorbent means for refining petroleum products. In general three different methods are used for refining petroleum oils with clays. These methods are the percolation process wherein liquid oil is percolated through granules of the clay, the contact process wherein liquid oil is contacted with finely pulverized clay and the vapor process wherein oil vapors are passed through granules of the clay. In all these methods, after the clays have refined a certain amount of oil they become so contaminated with carbonaceous impurities collected from the oil that they must be regenerated or discarded. Usually the contact clays are discarded after the first use and once used vapor process clays are thereafter employed in percolation processes. Accordingly, in practice, generally only granular percolation clays are regenerated. Heretofore regeneration has been effected principally by a chemical oxidation which universally consists of burning off the impurities.

In view of the fact that the petroleum products treated by percolation through solid adsorbents are combustible, it is evident that, when regeneration becomes necessary it is not the usual practice to pass the adsorbent directly to regeneration, either in the same container or in another operation, since the adsorbent carries a very considerable amount of the oil with which it has been in contact. If the oil is volatile, it is customarily removed by steaming. If it is a heavy oil, it is customarily removed by washing with a lighter, volatile oil, the residue of which, in turn is also removed by steaming. This operation is called a "steam purge" and is common throughout the art to which this invention appertains.

In the past various methods have been used for carrying out the burning of granular spent clay. One of the first comprised spreading the clay on an open hearth and burning it. Today there are three principal methods in general use. In the first method the clay falls or cascades over baffles set at about a 45° angle through a flue counter-current to gases of combustion. In the second method the clay is regenerated in a rotary kiln slightly inclined from the horizontal. In the third method, which probably is the most commonly used, multiple hearth burners are employed. These multiple hearth furnaces or burners are substantially the same as used in the roasting of ore and are of either the Nichols-Herreshoff or Wedge type. In these burners the clay is slowly rabbled across each hearth, dropping from one to another until the bottom hearth is reached. In all of these conventionally used methods there is a progressive degradation in the efficiency of the clay with each burning and finally the clay must be discarded to waste since it is no longer capable of being regenerated sufficiently to warrant further treatment.

The co-pending application Serial No. 210,150 (abandoned), filed May 26, 1938, and Patent No. 2,245,531, issued June 10, 1941, of John W. Payne disclose and claim two other methods adapted for regenerating clay.

While undoubtedly progressive degradation in efficiency of clay type adsorbents results from the uncontrolled burning of contaminants deposited thereon, it appears, from experimental work, that this tendency is at least augmented because of the steaming of the clay prior to the burning off of the contaminants, such wetting being an unavoidable incident of the steam purge.

Since clays which have had a different number of burnings by the present conventional processes have different efficiencies, they are kept separate and separately classified. In some of the larger refineries extensive inventories and bin facilities are required in order to maintain the clays according to their classification or efficiency. Not only does the large inventories of clay, bin facilities, etc., mean added expense but quite obviously the successive degradation in efficiency and the corresponding requirement of more clay increases the expense.

Most important amongst the disadvantages of the commonly used clay regeneration methods, however, is the fact the clay can only be regenerated a very limited number of times before its efficiency is so low that it does not pay to regenerate it, at which time the clay is thrown away to waste. In general, granular petroleum filter clays are only regenerated seven or eight times and practically never more than ten or fifteen times, at which time their efficiency is reduced to about 50% of the original and they are thrown away. As stated above, the finely pulverized contact clays, e. g., 200 mesh or finer, which are less frequently used, are practically never regenerated.

In order to further stress the tremendous importance of the problem involved it might be pointed out that over the U. S. there are roughly 5,000 tons of petroleum filter clay regenerated each day with the attendant degradation inefficiency accepted by the art. Furthermore each year the petroleum industry purchases about 225,000 tons of new fuller's earth alone, representing an expense of over four million dollars, and discards to waste roughly 200,000 tons of clay that is considered too spent to warrant regeneration.

It is a well known fact that every heavy oil refinery in the country has large dumps of spent clays that have been thrown away to complete waste. In some cases this waste clay is left as a dump and in other cases it is used for filling in low land, sold for fertilizers, etc. However, in all cases there is this enormous discarding of spent clays. Such waste is accepted as a necessary evil of the process.

There have been a few suggestions from time to time in other fields that clays might be regenerated to higher efficiency. Likewise in the petroleum industry it has been suggested that a particular form of clay under very special conditions might be regenerated to higher efficiency. However, the fact that other methods have not been taken up by the petroleum industry is believed conclusive that other known regeneration processes than those now used are not feasible for treatment of the clays used in refining petroleum or it is not obvious that they could be applied to regenerating petroleum clays. While such a fact is not usually so conclusive it is believed to be in the present case in view of the tremendous amounts of clay used and thrown away to waste each year as shown above and the increased amounts necessary because of the successive losses in efficiency as well as other attending disadvantages. Certainly it cannot be maintained that one of the country's largest industries would go on year after year suffering the above-mentioned wastes and disadvantages if a remedy therefor was obvious.

It is an object of our present invention to provide a method of improving the activity of solid adsorbent materials used in the refining of petroleum products.

Another object is to provide a method of regenerating refining clays used in the petroleum industry in such a manner that the regenerated clays are even more efficient than the original fresh clay.

Still another object of the present invention is to provide a method of regenerating clays used in refining petroleum products in such a manner that the clays do not suffer progressive degradation in efficiency with each regeneration, regardless of whether they are subjected to steam purging or other similar treatment to the oxidation of contaminants which may be deposited thereon.

Still another object is to provide a method which is capable of always regenerating the refining clays used in the petroleum industry to a sufficiently high efficiency to warrant regeneration and hence eliminating the waste of discarding spent clays.

A further object is to provide a method for regenerating refining clays used in the petroleum industry which is capable of reclaiming spent clays which are now being thrown away to complete waste.

An important object of the present invention is to provide a method which is capable of subjecting spent clays, whose efficiencies are so low that they would normally be discarded to waste since the present commonly used regenerating methods are not capable of regenerating the clays to a sufficiently high efficiency to warrant regeneration, to a regeneration process that regenerates such clays to a desirable efficiency.

Still a further object is to provide a process of increasing the useful life of the clays which process is capable of regenerating discarded spent clay of the petroleum industry to an efficiency greater than that of the original fresh clay.

Another object is to provide a method of improving the petroleum refining activity of a fresh clay which has never been used before for refining petroleum products.

The present invention is based upon the important discovery that solid adsorbent materials such as clays used in refining petroleum products when contaminated or coated with carbonaceous petroleum products may be subjected to a carbonizing treatment which converts at least a portion of the petroleum products on the clay to a deposit of carbon or essentially carbon creating an activated carbon layer thereon which gives the clay an enhanced petroleum refining activity. While it may be found desirable at each activation treatment or at intermittent treatments as the carbon content builds up to burn off part of the petroleum product or carbon associated with the clay, the essential feature is that at each treatment at least a sufficient portion of the petroleum product associated with the clay is carbonized on the clay to a highly active carbon deposit to give the clay an enhanced refining activity. Thus contrary to the conventional regeneration processes of today which regard the carbonaceous impurities as a complete evil which clogs the porous structure of the adsorbent and which must be completely burned off, the present invention makes use of at least a portion of this carbonaceous impurity by converting it to an activated carbon deposit on the clay.

The method for regenerating the clay for our process necessitates but little change in the present methods and means for regenerating clays. While other methods might be devised which incorporate the principles of our invention it is preferred to operate in a manner closely analogous to present burning method thus increasing the commercial acceptability of the process.

Accordingly our regeneration may be carried out by heating the spent clays under the well known clay burning conditions of time, temperature, etc., but with control of the oxygen content of the atmosphere contacting the clay in such manner that the regenerated clay carries an activated carbon deposit rather than having all the impurities burned off.

It has been found that the temperature of our carbonizing regenerating process may be varied over a considerably wider range than is desirable in the clay burning regeneration methods now being used. Thus in our process the temperatures required for destructive distillation of the adsorbent petroleum products may vary from that necessary to promote incipient distillation of the petroleum product up to that which will be damaging to the clay under the circumstances. In the conventional regenerating methods wherein the impurities are burned from the clay an extremely close temperature control should be maintained as otherwise inefficient regeneration or damage to the clay results. The temperature for clay burning should preferably be maintained substantially within the range of 950-1150° F. However, in the present process it has been found the carbonization regeneration may be effected, for instance, within the range of about 900°-1500° F., with equal success. This is of itself an advantage since the regeneration may be effected with less chances of damaging the clay. The optimum time of heating when carbonizing varies from a few seconds at 1500° F. to several minutes at 1000° F.

The important feature in regenerating by the present process is proper control of the atmosphere in the regenerating or activating zone. The essential feature is to sufficiently restrict the amount of air or other carbon oxidizing gas in the zone that complete combustion or oxidation of the petroleum products will not occur. It has been found that carbonization takes place both in the complete absence of air or other carbon oxidizing gas and also in the presence of limited amounts of air provided the quantity is insufficient to oxidize the activated carbon from the clay. Thus in carrying out the carbonization the heating zone may be completely sealed and no air admitted or a limited amount of air may be admitted with or without other inert gases. It has also been found that, if desired, steam may be admitted to the carbonizing zone. The presence of steam facilitates the removal of hydrocarbon vapors and reduces the rate of carbon build-up on the clay. For some oils it appears carbonizing in the presence of steam gives slightly better results, however, in general, reactivation is approximately the same for all the above carbonizing methods.

In practice we prefer to carry out our process in apparatuses such as disclosed in the two Patents No. 2,226,578, issued December 31, 1940, and No. 2,244,724, issued June 10, 1941, respectively, of John W. Payne, wherein the clay is passed through the regenerating zone in close proximity to a liquid heat transfer medium. These apparatuses have several construction and operating advantages over other known regenerating kilns. In regenerating clays by burning as is now commonly done in the art at extremely close temperature control should be maintained and for such regenerations the above mentioned Payne apparatuses are highly advantageous on this point alone. Furthermore, the apparatus disclosed in Patent No. 2,244,724 is well suited for regenerating the finely divided contact clays as well as the granular clays, the clays being carried through the apparatus suspended in a gaseous medium. However, as mentioned hereinabove the close temperature control of burning regenerations is not necessary in the present carbonizing process. Accordingly insofar as the degree of reactivation is concerned the present process may be carried out in other apparatuses such as the baffled vertical flue, rotary kiln or multiple hearth kilns now in common use in the industry with equal success, the cays being passed through these kilns in the same manner in which they are under present burning methods, it being understood, of course, that in any apparatus used appropriate provision is made for controlling the amount of air or other combustion supporting gas admitted to the carbonizing zone. It is believed, however, that in any commercial set up it will be found desirable to do a certain amount of burning as well as carbonizing. Accordingly, it is preferable to employ one of the Payne apparatuses as then the one apparatus may be used for both the burning and the carbonizing. Otherwise, if it is desired to obtain the advantages in burning that may be given by the Payne apparatuses separate kilns must be used for the carbonizing and the burning.

Thus far the manner of producing the carbon deposit on the solid inorganic adsorbent has been discussed, but little has been said of how much carbon should be left as an active carbon deposit on the clay or what the protective and refining activity effect of such a deposit will be. Since normally the steam purge directly follows a refining operation and thereafter the adsorbent is regenerated before further refining is undertaken, the effects of the steam purge will be first discussed and thereafter the refining activities of adsorbents regenerated according to the present invention.

Experiments on typical clay indicate that if contaminated percolation clays are wet with steam or water and then heated to normal regenerating temperatures of the order of 900° F. or higher, a loss of about 1% in decolorizing efficiency results. Then, if the clay is cooled, rewet and then reheated a further 1% decrease in decolorizing efficiency again results. In other words, repeated cycles of wetting, heating and cooling will each be accompanied by a 1% decrease in decolorizing efficiency. Since repeated cycles of this type are incident to the use of clays in decolorizing when the clay is wet during the steam purge, heated during the oxidation of the contaminants thereon and cooled during the decolorizing operation, it is evident that normal use will result in about a 1% loss in efficiency per cycle of employment. It has been demonstrated, however, that the presence of certain quantities of carbon on the clay will protect it from the detrimental effects of sequential wetting, heating and cooling. Typical experimental data to this effect is set out below; efficiency values being based on burned fuller's earth as 100% efficient.

TABLE I

WETTING AND REHEATING OF CLEAN AND CARBONIZED CLAYS

| Clay treatment | Per cent carbon on clay | Clays after treatment | | | |
| --- | --- | --- | --- | --- | --- |
| | | Decolorizing eff. of carbon-free clay, percolation stock | | Decolorizing eff. of clay with carbon thereon, percolation stock | |
| | | Sol. ref. | Acid ref. | Sol. ref. | Acid ref. |
| Fresh burned fuller's earth | 0.0 | 100 | 100 | | |
| Fresh burned fuller's earth after 20 wetting and heating cycles¹ | 0.0 | 79 | 71 | | |
| Carbonized fuller's earth after 20 wetting and heating cycles² | 4.8 | | 115 | 125 | 77 |
| Do | 8.2 | 93 | 136 | 250 | |
| Do | 12.7 | 99 | 142 | | |

¹ Cycle—Wet clay, heat to 1050° F. and cool.
² Clays were contaminated and carbonized during cycles.

It will be seen that these operations parallel the commercial handling of adsorbents in that clay is first treated with steam, as in the commercial steam purge, it is next heated to high temperatures, as in the commercial burning or regeneration, and is then cooled, just as in commercial practice prior to its return to the filtering operation. In other words, with respect to steaming, heating, and cooling each clay called for by any horizontal line of the table is subjected to the equivalent of twenty complete cycles of commercial use.

From the above it can be seen that the amount of carbon required to protect the clay varies somewhat depending upon the oil stock processed through it. The ratio of decolorizing efficiency to quantity of carbon by weight is expressed graphically in the figure of drawing in which the abscissa represents percentage by weight of carbon on clay and the ordinate represents percentage of decolorizing efficiency. It will be noted that the graph has been prepared to illustrate the table set out above.

The line in the drawing marked "Acid refined" indicates that not only is the clay protected against degradation in efficiency incident to 20 wetting-heating-cooling cycles, but that its clean burned efficiency for acid refined oils is actually enhanced if the ratio by weight of the carbon to the clay is in excess of about 2½%. On the other hand, the line marked "Solvent refined" in the drawing indicates that the maintenance of efficiency for that type of oil requires about 2½% by weight of carbon before any appreciable advantage over the uncarbonized clay is noted and about 12% for the prevention of efficiency loss as compared to new clay.

The data illustrated in the drawing is of course concerned with the efficiency of the clays upon clean burning after a series of wetting-heating-cooling cycles and as a consequence is illustrative of the protective effect of certain percentages of carbon on the clay. However, a considerable amount of research has been conducted in connection with the activity of the clay if used in percolation with the carbon still on it. In other words, while the carbon may be removed to see what the protective effect was, in use it may be desirable not to remove the carbon, knowing of course from the foregoing data that the protection is afforded. In order to clearly establish the surprising improvements which this invention involves when the carbonized clay is used in percolation decolorizing, a substantial amount of data will be set forth herein. For convenience certain criteria and notations used in these tests will be explained at this point. All of the activity tests are tests of the decolorizing efficiency of the clay by the percolation method and the values are also based on fresh clay as being 100%. The number of the clay indicates the number of times it has been regenerated (by conventional burning or the present carbonizing as indicated after the number). Various petroleum stocks were used in the tests and they are as follows:

| Stock | Sp. Gr. | S. U. Viscosity | Crude Source | Treatment Before Filtration |
|---|---|---|---|---|
| A | .880 | 245–254 @ 130° F | Okla. City (Resid.) | Duo Sol (solvent ref.). |
| B | .885 | 88–90 @ 210° F | do | Do. |
| C | .884 | 98–101 @ 210° F | do | Do. |
| D | .915 | 145–155 @ 210° F | do | Do. |
| E | .881 | 85–90 @ 210° F | do | Sulfuric Acid ref. |
| F | .925 | 61–63 @ 210° F | Coastal (Distillate) | Do. |
| G | .905 | 320–330 @ 100° F | Coastal (Dist.)+Paraffin (Dist.) | Do. |
| H | .876 | 55–60 @ 210° F | Pa. Bright Stock+Pa. Neutral | Chlorex (solvent ref.). |

As noted hereinabove the carbonization may be effected (with certain restrictions) in various types of apparatuses and in the presence of various atmospheres. These statements may be confirmed by the following tabular data:

TABLE II

| B. F. C. Stock | Clay No. | Conventional Burning, Per Cent Activ. Hearth Burned Clay | Activity of Clay Carbonized in Different Equipment | | | | |
|---|---|---|---|---|---|---|---|
| | | | Closed Pan in Muffle (With Steam) | Closed Pan in Muffle (Without Steam) | Payne Appar. of Pat. 2,244,724 (limited Air) | Payne Appar. of Pat. 2,226,578 (limited Air) | Heated Tube in Lead Bath (No Air) |
| 1A | Fresh Burned | 100 | 100 | 100 | 100 | 100 | 100 |
| 2A | No. 1 | 84 | 171 | 165 | | 190 | 174 |
| 3A | No. 2 | 76 | 184 | 128 | | | |
| 4A | No. 4 | 69 | 184 | 204 | | | |
| 5A | No. 6 | 65 | 206 | 228 | 235 | | |
| 6A | No. 8 | 61 | 165 | 260 | | | |
| 7A | No. 10 | 57 | 237 | | | | |
| 8A | Fresh Burned | 100 | 100 | 100 | 100 | | |
| 9A | No. 4 | 70 | 115 | 90 | 105 | | |
| 10B | Fresh Burned | 100 | 100 | 100 | | 100 | 100 |
| 11B | No. 10 | 48 | 209 | 190 | | 195 | 181 |
| 12C | Fresh Burned | 100 | 100 | 100 | 100 | | |
| 13C | No. 4 | 69 | 131 | 106 | 125 | | |
| 14C | No. 5 | 62 | 137 | 100 | | | |
| 15C | No. 6 | 56 | 137 | 94 | 120 | | |

It will be seen from the above table that the activity obtained varies somewhat with the apparatuses and the atmospheres therein and also as to the particular oil being refined. However, in general the results are comparable and all show tremendous improvement over the conventional burning regeneration. The improvement over conventional burning will be pointed out more in detail hereinafter.

It will be recalled that one of the principal objects of the present invention was the regeneration of clay to a higher activity than is obtainable by present methods in common use. That such object has been attained to a high degree by the present invention can be seen clearly from the following data:

TABLE III

COMPARATIVE YIELDS FROM BURNED AND CARBONIZED CLAY

[Per cent percolation efficiency (without naphtha dilution)]

| Stock | Clay | Multiple Hearth Burned Clay Eff. | Wt. Per Cent Carbon | Carbonized Clay Eff. |
|---|---|---|---|---|
| A | Fresh burned | 100 | 0 | 100 |
|   | No. 10 | 55 | 8.0 | 217 |
|   | Av. No. 1 to No. 10 | 66 | 5.0 | 193 |
| B | Fresh burned | 100 | 0 | 100 |
|   | No. 10 | 50 | 8.5 | 250 |
|   | Av. No. 1 to No. 10 | 63 | 5.5 | 246 |
| C | Fresh burned | 100 | 0 | 100 |
|   | No. 9 | 52 | 0.0 | 125 |
|   | Av. No. 1 to No. 9 | 66 | 4.0 | 131 |
| D | No. 10 | 65 | | 220 |
| E | Fresh burned | 100 | 0 | 100 |
|   | No. 4 | 76 | 4.5 | 56 |
|   | Av. No. 1 to No. 4 | 86 | 2.5 | 70 |
| F | Fresh burned | 100 | 0 | 100 |
|   | No. 10 | 50 | 8.0 | 90 |
|   | Av. No. 1 to No. 10 | 65 | 5.0 | 96 |
| G | Fresh burned | 100 | 0 | 100 |
|   | No. 6 | 58 | 5.5 | 77 |
|   | Av. No. 1 to No. 6 | 69 | 2.5 | 80 |
| H | Fresh burned | 100 | 0 | 100 |
|   | No. 1 | 88 | | 117 |
|   | No. 2 | 93 | | 130 |
|   | No. 3 | 66 | | 130 |

From the second column of the above table it can be seen that the percentage by weight of carbon on the clay varies between 2.5 and 8. This has been found to be the range productive of greatest efficiency gains, and it should be noted that it lies within the range set out in the figure of drawing and described above in connection with protecting clays from the effects of the steam purge.

The tremendous improvement and advancement of the art by the present process is apparent from the table. With all the oils treated (except one) the carbonized clay showed marked improvement over the corresponding burned clay. It is needless to point out the commercial advantage of such increased activity. For some reason, at present unknown, carbonized clay shows even much greater activity toward solvent refined oils than toward the oils which have been refined with sulfuric acid. It will be noted that on some of these solvent refined oils the activity of the carbonized clay goes even above 200%. Furthermore that clays which have been burned 10 times and upon another burning regeneration have an efficiency around 50, at which time they would usually be discarded to waste, may be regenerated by our carbonizing process and have their efficiency go up above 200%. This further important specific discovery with respect to the solvent refined oils is covered in Patent 2,245,016, issued June 10, 1941.

It will also be noted from Table III that in general the activity of the carbonized clay towards acid treated oils shows a marked improvement over burned clays even though the improvement is not as much as for solvent refined oils. In one case, stock E, the carbonized clay showed a slightly less activity than the burned clay. This exception cannot be explained, nevertheless there is a distinct advantage in carbonizing the clay used on this oil. The less efficiency of the carbonized clay on stock E is far offset by the fact that when the carbonized clay reaches a low efficiency, which under present day practice would require its being thrown away, this clay may be carefully burned to remove the carbon and yield a clay which has substantially its original activity and which may be sent through further carbonizing and burning cycles thus indefinitely extending its life or usefulness. This same cycle procedure may be used on the clays for treating the other oils if desired including even the clays for treating the solvent refined oils, in fact, after many carbonizations the carbon deposit on the clays may be so great that it is desired to burn off part or all even though the efficiency is up fairly well. This process of regenerating clays by carbonizing and burning cycles forms the subject matter of Patent 2,299,258, issued October 20, 1942.

Another principal object of the present invention was to provide a method of regenerating clay wherein the clay did not suffer successive degradations in efficiency with each regeneration and finally must be thrown away but rather could be regenerated to high efficiency indefinitely. That such object has been attained by the present process may be seen from the following data:

TABLE IV

| Clay Method of Reactivation | Stock A[1] Percolated to 55 Lov. | | Stock B[2] Percolated to 75 Lov. | | Stock C[3] Percolated to 12.5 Lov. | Stock F[4] Percolated to 5 Lov. |
|---|---|---|---|---|---|---|
| | Straight | Solution (A) | Straight | Solution (A) | Straight | Straight |
| Fr. Burned Clay........per cent.. | 100 | 92 | 100 | 97 | 100 | 100 |
| No. 5-10 Ref. Burned Clay (Ave.) | | | 48 | 42 | | |
| No. 7-10 Ref. Burned Clay (Ave.) | 63 | 53 | | | | |
| Carbonization: | | | | | | |
| No. 1 Fr. Clay | 173 | 138 | 194 | 123 | 125 | 100 |
| No. 2 Fr. Clay | 183 | 159 | 248 | 161 | 125 | 95 |
| No. 3 Fr. Clay | 183 | 100 | 186 | 149 | 131 | 100 |
| No. 4 Fr. Clay | 183 | 145 | 186 | 134 | 131 | 115 |
| No. 5 Fr. Clay | 210 | 143 | 209 | 155 | 137 | 85 |
| No. 6 Fr. Clay | 206 | 140 | 388 | | 137 | 95 |
| No. 7 Fr. Clay | 206 | | | | 131 | 110 |
| No. 8 Fr. Clay | 165 | 138 | | | 131 | 85 |
| No. 9 Fr. Clay | 286 | | | | 125 | 95 |
| No. 10 Fr. Clay | 237 | | 358 | | | 80 |
| No. 11 Fr. Clay | 286 | | 410 | | | |
| No. 13 Fr. Clay | 173 | | | | | |
| No. 14 Fr. Clay | 194 | | | | | |
| No. 15 Fr. Clay | | | 209 | | | |
| Average | 206 | 138 | 266 | 144 | 130 | 96 |

(A) Solution consists of 50% (vol.) oil and 50% (vol.) of naphtha. Yields are based on reduced oil.
[1] Initial color 105 Lovibond (¼" Cell).
[2] Initial color 120 Lovibond (¼" Cell).
[3] Initial color 95 Lovibond (¼" Cell).
[4] Initial color 15 Lovibond (¼" Cell).

The above table shows that the successive degradation in efficiency which is always obtained with burning regenerations is not obtained with our carbonizing but instead the activities come back time after time to a high level. As mentioned hereinabove, under present day conventional burning regenerations the clays are thrown away after 7 to 10 regenerations. From the above table it is seen that at 7 to 10 regenerations the efficiency of the clay is still at a very high level and that the efficiency stays at the high level upon further regenerations. Theoretically clays could be regenerated forever by our process; however, by present methods and means of regeneration there is about a 2% mechanical loss of clay from handling with each regeneration. Therefore the clay is lost through handling before it reaches a point at which regeneration is not feasible. As the loss is about 2% per regeneration this would mean the clay could be regenerated in practice about 50 times.

One of the most surprising and important features of the present invention is the fact that clays which have been regenerated by conventional burning methods until their efficiency is so low it no longer pays to regenerate them, i. e., they have been burned about 10 times and their efficiency is around 50% or 60%, may now be subjected to our carbonizing treatment and their efficiency becomes greater than their efficiency as a fresh clay. More surprising still is the fact it is possible to reclaim these burned clays that have been thrown away. For instance, it is possible to bring in discarded clays off the dumps at the refinery which, as explained above, have been thrown away because of their low efficiency, and subject these discarded clays to our carbonizing process and bring their efficiency or activity up to a value which is greater than that possessed by the original fresh clay. In the case of discarded contact clays it has also been found feasible to convert same to granular clay by extrusion, e. g., forming 36 mesh granules, and carbonizing this "synthetic" granular clay. The following data illustrates the type results that may be obtained in reclaiming discarded clays:

TABLE V

CLAY

*Method of reactivation*

|  | Stock A Percolated to 55 Lov. Straight | Stock B Percolated to 75 Lov. Straight |
|---|---|---|
| Carbonization No. 1 of No. 10 Refinery Clay | 140 | 164 |
| Carbonization No. 2 of No. 10 Refinery Clay | 149 | 248 |
| Carbonization No. 3 of No. 10 Refinery Clay | 129 | 201 |
| Carbonization No. 4 of No. 10 Refinery Clay | 131 | 170 |
| Carbonization No. 5 of No. 10 Refinery Clay | 125 | 124 |
| Carbonization No. 6 of No. 10 Refinery Clay | 139 | 128 |
| Carbonization No. 7 of No. 10 Refinery Clay | 149 | 194 |
| Carbonization No. 8 of No. 10 Refinery Clay | 163 | 239 |
| Carbonization No. 9 of No. 10 Refinery Clay | 163 | 239 |
| Carbonization No. 10 of No. 10 Refinery Clay | 159 |  |
| Average | 145 | 190 |

The data of Table V also further evidences the fact that clays may be regenerated indefinitely by our process. For instance in the ninth carbonization the clay has had nineteen regenerations (10 burning and 9 carbonizing) and is efficiency is from 163 to 239%.

The tremendously important commercial aspects of all the features of our invention should be readily apparent from the foregoing data. The enormous saving which may be made by the present invention over presently used burning regeneration methods is obvious.

Since it may not be apparent from the data it might be well to state that carbonized or burned clays which have been used for refining acid treated oils may be subjected to a carbonizing treatment and then used for refining solvent refined oils and it is found that their activity for the solvent refined oils is of the extremely high nature of the clays shown in the tables.

The physical characteristics and oxidation stability of oils percolated through our carbonized clays are approximately the same as those of oils percolated to the same blend color through conventionally burned clays as is shown by Table VI.

TABLE VI

PROPERTIES OF OILS PERCOLATED THROUGH CARBONIZED AND PLANT BURNED CLAYS

| Stock | Type of Clay | Color | | S. U. V. @ | | V. I. |
|---|---|---|---|---|---|---|
| | | Lovibond (¼" Cell) | Story (1" Cell) | 100° F. | 210° F. | |
| 1A | Fresh Burned Clay | 55 | 56 | | | |
| 2A | No. 7-10 Plant Burned Clay | 55 | 62 | | | |
| 3A | Fresh Clay Burned after 11 Carbonizations | 52 | 46 | | | |
| 4A | Fresh Clay after 2 Carbonizations | 55 | 52 | | | |
| 5A | Fresh Clay after 5 Carbonizations | 55 | 50 | 577 | 67.3 | 96 |
| 6A | Fresh Clay after 11 Carbonizations | 55 | 52 | 579 | 67.3 | 96 |
| 7A | Fresh Clay after 14 Carbonizations | 55 | 54 | 580 | 67.7 | 96.8 |
| 8A | No. 10 Plant Clay after 2 Carbonizations | 53 | 50 | | | |
| 9A | After 4 Carbonizations | 55 | 50 | 578 | 67.2 | 96 |
| 10A | No. 7-10 Plant Clay after 1 Carbonization | 57 | 57 | 571 | 66.9 | 95.4 |
| 11A | Fresh Clay after 1 Carbonization without steam | 57 | 59 | | | |
| 12A | Fresh Clay after 4 Carbonizations without steam | 56 | 54 | 576 | 67.3 | 96.1 |
| 13B | Fresh Burned Clay | 72 | 87 | 1049 | 90.6 | 95.6 |
| 14B | No. 5-10 Plant Burned Clay | 73 | 91 | 1042 | 90.4 | 95.8 |
| 15B | Fresh Clay Burned after 15 Carbonizations | 75 | 81 | 973 | 87.1 | 95.6 |
| 16B | Fresh Clay Burned after 2 Carbonizations | 75 | 91 | 1058 | 91.6 | 95.6 |
| 17B | Fresh Clay Burned after 10 Carbonizations | 75 | 93 | 1063 | 91.4 | 95.6 |
| 18B | No. 5-10 Plant Clay after 1 Carbonization | 75 | 79 | 1002 | 88.4 | 95.1 |
| 19B | No. 10 Plant Clay after 2 Carbonizations | 76 | 85 | 1064 | 91.2 | 95.3 |
| 20B | After 4 Carbonizations | 75 | 81 | 998 | 88.2 | 95.8 |
| 21C | Fresh Burned Clay | 12.5 | 8.0 | | | |
| 22C | Clay Burned after 6 carbonizations | 12.5 | 8.0 | | | |
| 23C | Fresh Clay after 5 Carbonizations | 15.0 | 13.5 | | | |
| 24C | Fresh Clay after 9 Carbonizations | 12.5 | 9.0 | | | |

A further advantage of the present process results from the more efficient regeneration that is possible. Because of this more efficient regeneration, smaller inventories of clay are required and consequently less capital investment. Further since the clays may be used many more times the expense for new quantities of clay is materially reduced. Moreover, the extensive classifications and bin facilities required by present day conventional methods of regeneration may be eliminated. Under the present process the clay need only be separated into two classes, that is, fresh clay and revivified or carbonized clay.

While the invention has been described hereinbefore principally with respect to regeneration of spent clays, the invention may be made use of to increase the activity of fresh clay. Thus fresh clay may be dipped or otherwise coated with a suitable peroleum oil and then subjected to our carbonizing process, thereby giving it an activity which is greater than its original activity.

The invention has been described in detail with respect to treatment of petroleum refining clays. While clays and particularly fuller's earth are by far the most commonly used solid porous adsorbent means for refining petroleum today, other solid adsorbent materials such as bauxite, silica gel, etc., are used to a limited extent in place of clays. It is to be understood that the present invention is also applicable to these other solid adsorbent refining materials that may be used in place of clays for refining petroleum.

This application is a continuation-in-part of our co-pending application Serial No. 275,672 (abandoned), filed May 25, 1939.

We claim:

In a method of treating acid refined petroleum oils, the improvement which comprises treating said acid refined oils with a finely divided porous adsorptive clay-type inorganic material carrying an outer layer deposit of not less than 2½% of activated carbon resulting from the incomplete combustion and removal of petroleum oil.

THOMAS P. SIMPSON.
JOHN W. PAYNE.
PETER D. VALAS.

REFERENCES CITED

The following references are of record in the file of this patent:

UNITED STATES PATENTS

| Number | Name | Date |
| --- | --- | --- |
| 617,079 | Catlett | Jan. 3, 1899 |
| 1,314,204 | Mumford | Aug. 26, 1919 |
| 1,452,739 | Hood | Apr. 24, 1923 |
| 1,528,370 | Gambel | Mar. 3, 1925 |
| 1,589,532 | Hoodless | June 22, 1926 |
| 1,598,967 | Hiller | Sept. 7, 1926 |
| 1,680,908 | Nashida et al. | Aug. 14, 1928 |
| 1,867,435 | Adair | July 12, 1932 |
| 1,943,246 | Towne | July 9, 1934 |
| 1,945,479 | Davis | Jan. 30, 1934 |
| 1,967,636 | Towne | July 24, 1934 |
| 2,127,702 | Schmidt | Aug. 23, 1938 |
| 2,156,591 | Jacobson | May 2, 1939 |
| 2,173,844 | Houdry | Sept. 26, 1939 |
| 2,242,639 | Barton | May 20, 1941 |
| 2,245,016 | Simpson et al. | June 10, 1941 |
| 2,290,580 | Degnen et al. | July 21, 1942 |
| 2,346,127 | Simpson et al. | Apr. 11, 1944 |

FOREIGN PATENTS

| Number | Country | Date |
| --- | --- | --- |
| 8,561 | Great Britain | May 20, 1898 |
| 185,174 | Great Britain | Aug. 24, 1922 |
| 287,141 | Great Britain | Feb. 4, 1929 |
| 492,929 | Great Britain | Sept. 29, 1938 |

Certificate of Correction

Patent No. 2,449,016.　　　　　　　　　　　　　September 7, 1948.

THOMAS P. SIMPSON ET AL.

It is hereby certified that errors appear in the printed specification of the above numbered patent requiring correction as follows:

Column 4, line 73, for the word "adsorbent" read *adsorbed*; column 5, line 53, for "at extremely" read *an extremely*; line 70, for "cays" read *clays*; column 9, line 16, Table III, fourth column thereof, for "0.0" read *7.0*; column 12, line 29, for "and is" read *and its*; column 13, line 19, for "peroleum" read *petroleum*;

and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*

A further advantage of the present process results from the more efficient regeneration that is possible. Because of this more efficient regeneration, smaller inventories of clay are required and consequently less capital investment. Further since the clays may be used many more times the expense for new quantities of clay is materially reduced. Moreover, the extensive classifications and bin facilities required by present day conventional methods of regeneration may be eliminated. Under the present process the clay need only be separated into two classes, that is, fresh clay and revivified or carbonized clay.

While the invention has been described hereinbefore principally with respect to regeneration of spent clays, the invention may be made use of to increase the activity of fresh clay. Thus fresh clay may be dipped or otherwise coated with a suitable peroleum oil and then subjected to our carbonizing process, thereby giving it an activity which is greater than its original activity.

The invention has been described in detail with respect to treatment of petroleum refining clays. While clays and particularly fuller's earth are by far the most commonly used solid porous adsorbent means for refining petroleum today, other solid adsorbent materials such as bauxite, silica gel, etc., are used to a limited extent in place of clays. It is to be understood that the present invention is also applicable to these other solid adsorbent refining materials that may be used in place of clays for refining petroleum.

This application is a continuation-in-part of our co-pending application Serial No. 275,672 (abandoned), filed May 25, 1939.

We claim:

In a method of treating acid refined petroleum oils, the improvement which comprises treating said acid refined oils with a finely divided porous adsorptive clay-type inorganic material carrying an outer layer deposit of not less than 2½% of activated carbon resulting from the incomplete combustion and removal of petroleum oil.

THOMAS P. SIMPSON.
JOHN W. PAYNE.
PETER D. VALAS.

REFERENCES CITED

The following references are of record in the file of this patent:

UNITED STATES PATENTS

| Number | Name | Date |
|---|---|---|
| 617,079 | Catlett | Jan. 3, 1899 |
| 1,314,204 | Mumford | Aug. 26, 1919 |
| 1,452,739 | Hood | Apr. 24, 1923 |
| 1,528,370 | Gambel | Mar. 3, 1925 |
| 1,589,532 | Hoodless | June 22, 1926 |
| 1,598,967 | Hiller | Sept. 7, 1926 |
| 1,680,908 | Nashida et al. | Aug. 14, 1928 |
| 1,867,435 | Adair | July 12, 1932 |
| 1,943,246 | Towne | July 9, 1934 |
| 1,945,479 | Davis | Jan. 30, 1934 |
| 1,967,636 | Towne | July 24, 1934 |
| 2,127,702 | Schmidt | Aug. 23, 1938 |
| 2,156,591 | Jacobson | May 2, 1939 |
| 2,173,844 | Houdry | Sept. 26, 1939 |
| 2,242,639 | Barton | May 20, 1941 |
| 2,245,016 | Simpson et al. | June 10, 1941 |
| 2,290,580 | Degnen et al. | July 21, 1942 |
| 2,346,127 | Simpson et al. | Apr. 11, 1944 |

FOREIGN PATENTS

| Number | Country | Date |
|---|---|---|
| 8,561 | Great Britain | May 20, 1898 |
| 185,174 | Great Britain | Aug. 24, 1922 |
| 287,141 | Great Britain | Feb. 4, 1929 |
| 492,929 | Great Britain | Sept. 29, 1938 |

Certificate of Correction

Patent No. 2,449,016.   September 7, 1948.

THOMAS P. SIMPSON ET AL.

It is hereby certified that errors appear in the printed specification of the above numbered patent requiring correction as follows:

Column 4, line 73, for the word "adsorbent" read *adsorbed*; column 5, line 53, for "at extremely" read *an extremely*; line 70, for "cays" read *clays*; column 9, line 16, Table III, fourth column thereof, for "0.0" read *7.0*; column 12, line 29, for "and is" read *and its*; column 13, line 19, for "peroleum" read *petroleum*;

and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*